(12) United States Patent
Michal et al.

(10) Patent No.: US 6,654,514 B2
(45) Date of Patent: Nov. 25, 2003

(54) TUNED FIBER OPTIC INTERLEAVER

(75) Inventors: Ronald J. Michal, Wrightwood, CA (US); Amado Cordova, Venice, CA (US)

(73) Assignee: Copley Networks, Inc., City of Industry, CA (US)

( * ) Notice: Subject to any disclaimer, the term of this patent is extended or adjusted under 35 U.S.C. 154(b) by 0 days.

(21) Appl. No.: 09/968,463

(22) Filed: Oct. 1, 2001

(65) Prior Publication Data

US 2003/0063845 A1 Apr. 3, 2003

(51) Int. Cl.[7] ................................................ G02B 6/28
(52) U.S. Cl. ........................ 385/24; 385/14; 385/15
(58) Field of Search ........................ 385/14, 15, 16, 385/24, 27, 28

(56) References Cited

U.S. PATENT DOCUMENTS 5,636,309 A * 6/1997 Henry et al. ................ 385/129
6,031,948 A * 2/2000 Chen ........................... 385/24
6,185,345 B1 * 2/2001 Singh et al. .................. 385/24

* cited by examiner

Primary Examiner—John D. Lee
Assistant Examiner—Jennifer Doan
(74) Attorney, Agent, or Firm—Elliott N. Kramsky

(57) ABSTRACT

An optical fiber interleaver and method for aligning the output channels to a set of nominal values in frequency space. The interleaver is formed of two optical fibers joined together at fused input and output couplers to define an input section, an interferometer section and an output section. Within the interferometer section, an element is arranged to vary the optical path length of at least one of the fibers in response to a feedback signal. The feedback signal is generated by examination of the intensity of a monitor signal at the output section that was applied at the input section.

26 Claims, 3 Drawing Sheets

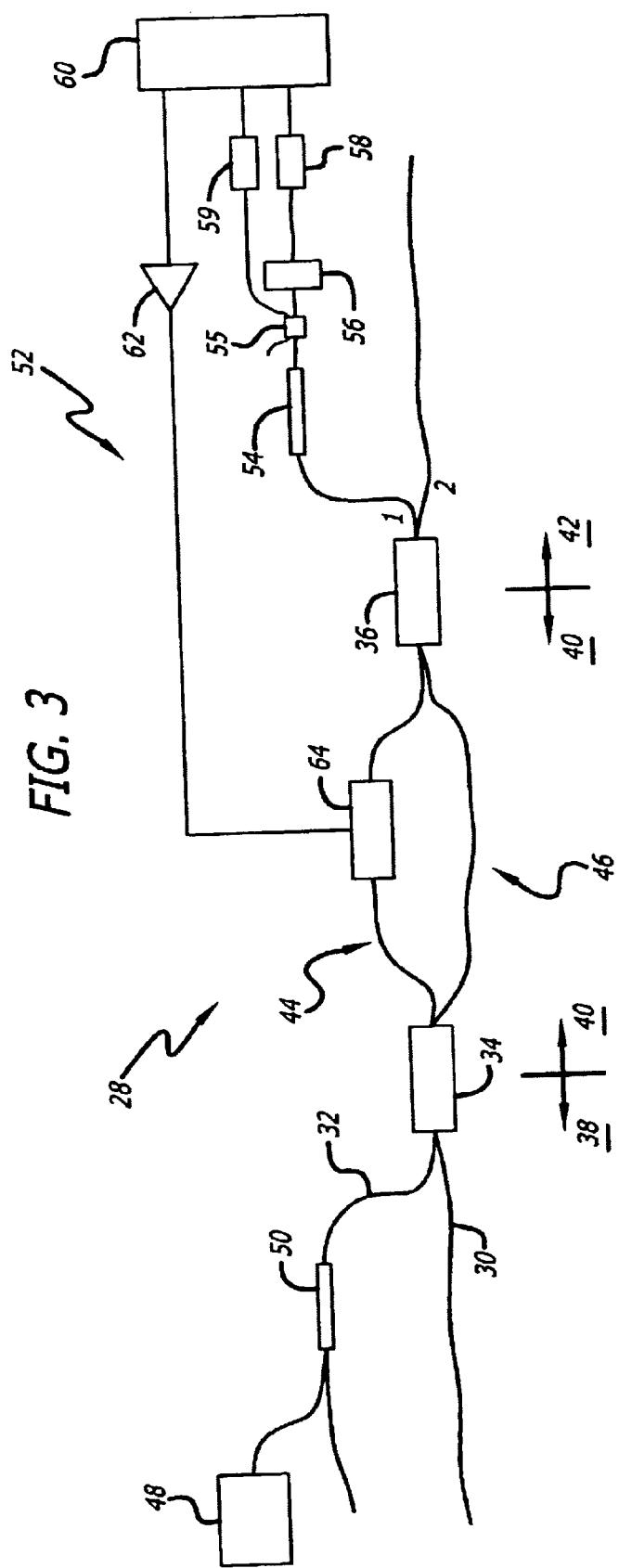
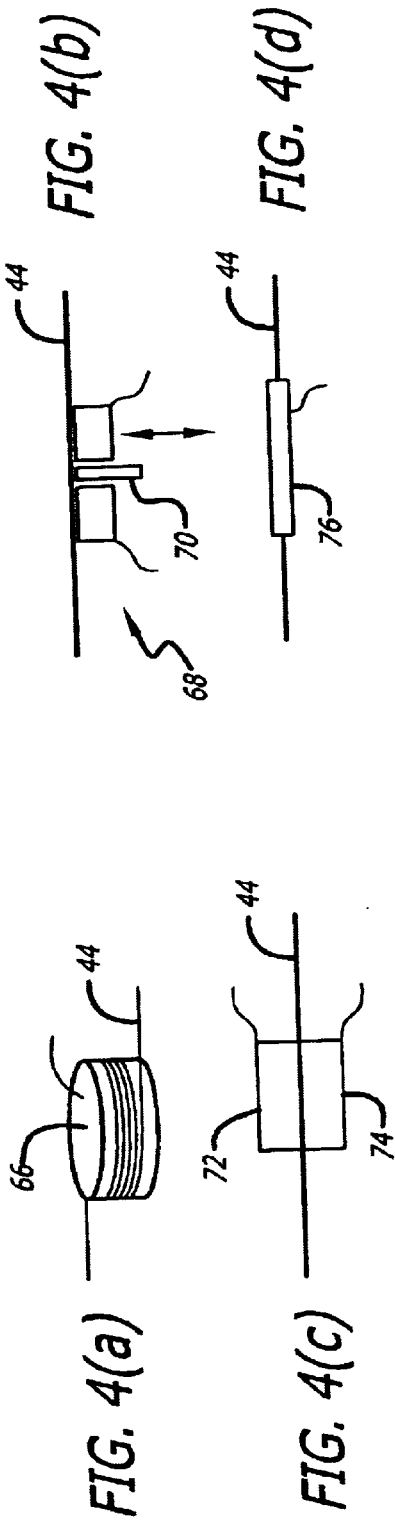

TUNED FIBER OPTIC INTERLEAVER

BACKGROUND

1. Field of the Invention

The present invention relates to optical interleavers for combining and separating pluralities of optical wavelength channels. More particularly, this invention pertains to apparatus for assuring alignment of the optical channels at the output ports of an interleaver to pre-designated International Telecommunications Union (ITU) grid frequencies.

2. Description of the Prior Art

The interleaver is a device that functions in an optical network to combine two input sets of wavelengths in which the channels of one set of wavelengths are offset by one half the channel spacing from those of the other set. Such a device is ideal for ultra dense networks. Further, interleavers can work in reverse to separate a single densely packed channel set into two output fibers, each of twice the channel spacing of the original set. They may be cascaded to provide further channel separation on four output fibers, each transmitting one fourth of the number of channels and four times the channel spacing. An interleaver or an array of interleavers allows the use of simpler thin-film filters or arrayed waveguide gratings to separate the individual channels.

FIG. 1 is schematic view of an optical interleaver 10. Such a device operates upon an interferometric principle and the analysis that follows is applicable to a number of two-beam interferometric interleavers including Mach Zender and birefringent plate.

The interleaver 10 comprises a first coupler 12 for splitting light from a light source 14 into two beams. The beams travel separate optical paths 16 and 18 that terminate at a second coupler 20. Each of the couplers 12 and 20 is a fused biconical coupler made, as is well known in the art, in accordance with biconical tapered fusion technology. They may comprise a pair of optical fibers that have been stripped of their outer jackets and carefully cleaned. The claddings of the glass fibers are held in contact, heated to melting temperature and tension applied to reduce the thickness in the region of contact. At this point, the cores of the fibers (each about 9 microns in diameter) are very closely spaced to thereby achieve optical coupling between the two fiber cores. The resultant device is commonly encapsulated in a quartz tube. Through the phenomenon of evanescent coupling, light traveling through the core of one fiber is coupled into the core of the other fiber resulting in "splitting" of the optical signal. A coupler may act in reverse to combine the light traveling through the two fibers into a single fiber, thus acting as a "combiner". In FIG. 1, the coupler 12 is shown to act as a splitter while the coupler 20 acts as a combiner.

FIG. 2 is a plot of the interleaver's frequency response, namely the normalized output power versus optical frequency (in THz) as defined by the preceding equations for an interferometer based upon the principle of the Mach-Zender interferometer having the following parameters: $\alpha=0.51$, $\beta=0.49$ (power splitting ratios); L1=0.25 dB, L2=1.0 dB (optical power loss of paths 16, 18 in dB, related to amplitude loss coefficient $\delta$ by $e^{-2\delta}=10^{-L/10}$); optical path length difference=1.5 mm. The optical path length difference $\Delta\theta$ is related to optical phase shift difference $\Delta\Phi$ by $$\Delta\Phi=2\Pi\nu\Delta\theta/c \qquad (9)$$

Where c is the speed of light in a vacuum and $\Delta\theta$ is related to the refractive index and length L as $\Delta\theta=\Delta(nL)$.

The logarithmic plot of FIG. 2 with the output taken at port "1" of FIG. 1 indicated by the succession of maxima and minima of the curve denoted 22 and the output taken at port "2" of FIG. 1 indicated by the succession of maxima and minima of the curve denoted 24 illustrates a frequency spacing between two peaks of a given output of 0.2 THz (200 GHz) with the signals at the two outputs shifted with respect to one another by 0.1 THz (100 GHz). Since a non-zero loss is assumed, the peak amplitudes at the two outputs do not equal 1.0.

The operation of an interleaver as a multi-channel signal splitter can be understood from FIG. 2. Assuming that the input is a series of mutually incoherent wave channels whose frequency bands do not overlap and that are separated by 100 GHz, the interleaver 10 separates adjacent channels as follows: "odd" frequency channels are forwarded to the output port 1 of FIG. 1 as constructive interference occurs at this output for such frequencies while "even" frequency channels are forwarded to output port 2 as constructive interference for even channels occurs at output port 2.

Various issued and pending U.S. patents and patent applications address the critical relationship between channel spacing and optical path length difference in an interleaver operating as a Mach Zehnder interferometer. These include U.S. Pat. No. 6,031,948 of Chen covering "Fused-Fiber Multi-Window Wavelength Division Multiplexer Using an Unbalanced Mach-Zehnder Interferometer and Method of Making Same" and pending U.S. patent application Ser. Nos. 09/861,910 and 09/862,146, now allowed, of Dent et al. covering "Method For Making All Fiber Interleaver With Continuous Fiber Arm" and "Optical Interleaver With Image Transfer Element" respectively. Each of the pending applications is the property of the assignee herein.

In addition to providing interleaver designs characterized by optical path length differences that assure precise channel spacing, it is essential that optical channels remain tuned to the optical signal grid at all times and under all environmental conditions. (Generally, this will be the internationally-recognized ITU grid.) Tuning assures that the optical channels will be optimally processed by the elements of the system. Otherwise, power loss, crosstalk and signal distortion may be experienced.

Channel tuning requires maintenance and adjustment of the phases of the sinusoidal interleaver outputs. Such phase is known to be temperature sensitive, requiring the interleaver to be thermally controlled, a relatively difficult and expensive process.

SUMMARY OF THE INVENTION

The present invention overcomes the foregoing shortcomings of the prior art by providing, in a first aspect, an optical interleaver for separating an input DWDM signal occupying a nominal frequency band into two output signals. One of such output signals comprises a plurality of odd optical channels and the other comprises a plurality of even optical channels within the frequency band.

Such interleaver includes a first optical fiber and a second optical fiber, each having opposed ends. The first and second fibers are fused together intermediate their ends to form first and second couplers. In this way, an input section is defined before the first coupler, an interferometer section is defined between the first and second couplers, and an output section is defined after the second coupler.

A first tap coupler is provided within the input section for receiving a monitor signal having a nominal frequency. A second tap coupler is provided within the output section for providing an interleaver output signal. An optical path length adjustment element is provided for shifting the monitor signal in frequency space. Such optical path length adjustment element is responsive to a feedback signal.

A circuit is provided for generating the feedback signal. Such circuit is responsive to the interleaver output signal.

In a second aspect the invention provides a method for aligning the channels at an output of an optical interleaver to a set of nominal values within a nominal frequency band in frequency space. Such interleaver includes a first and a second optical fiber, each having opposed ends and fused together between their ends for form first and second couplers to define an input section before the first coupler, an interferometer section between the first and second couplers, and an output section after the second coupler. Such method is begun by inputting a monitor signal of nominal frequency outside said frequency band at said input section. The monitor signal is observed at the output section and at least one of the fibers is adjusted within the interferometer section in response to the observed monitor signal. Such process is continued as long as the center frequency approaches the nominal value.

The foregoing and additional features and advantages of this invention will become further apparent from the detailed description that follows. Such description is accompanied by a set of drawing figures. Numerals of the drawing figures, corresponding to those of the written description, point to the features of the invention with like numerals referring to like features throughout both the written description and the drawings.

BRIEF DESCRIPTION OF THE DRAWINGS

FIG. 3 is a schematic diagram of an interleaver in accordance with the invention;

FIGS. 4(a), 4(b), 4(c) and 4(d) illustrate alternative embodiments of fiber adjustment elements in accordance with the present invention.

DETAILED DESCRIPTION OF THE PREFERRED EMBODIMENT

Figure 1:
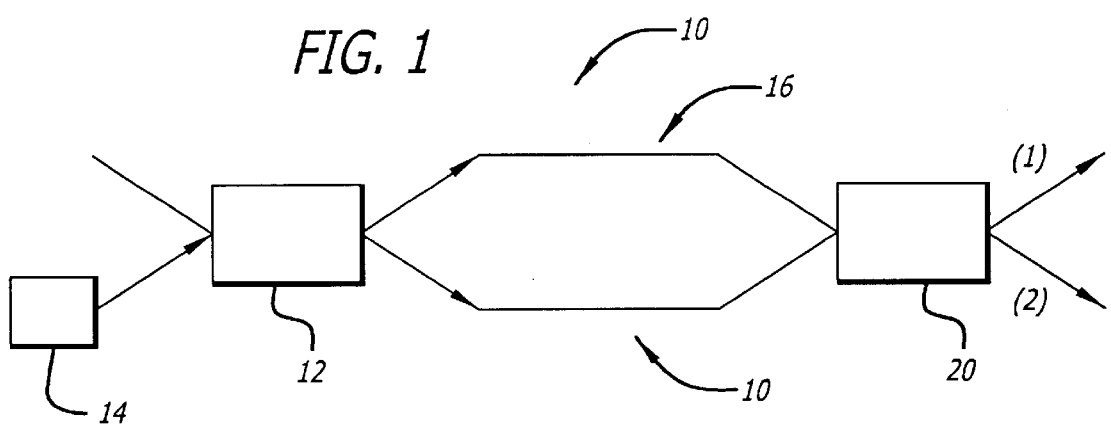
FIG. 1 is a schematic view of an optical interleaver.
Figure 2:
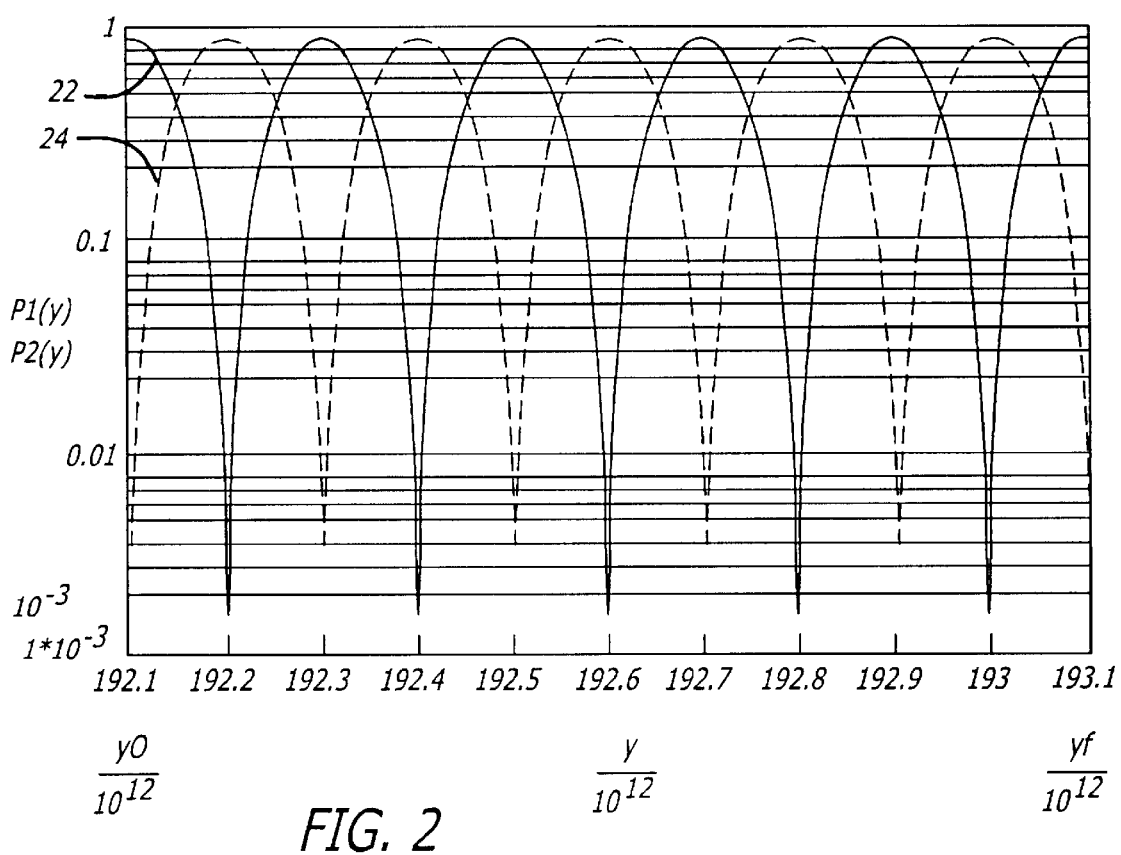
FIG. 2 is a graph (logarithmic vertical scale) of normalized output power as a function of optical frequency for an interleaver based upon the Mach Zender interferometer.

An interleaver 28 in accordance with the invention is illustrated in FIG. 3. Such interleaver 28 includes an arrangement for continuous monitoring of the alignment of the center or peak frequencies of the optical channels (output at the ports 1 and 2) with respect to the predetermined frequencies of an optical signal transmission grid such as the internationally-recognized ITU grid.

The interleaver 28 comprises a pair of optical fibers 30 and 32. The fibers 30 and 32 are fused together to form couplers 34 and 36 and thereby define distinctive input 38, interferometer 40 and output 42 sections. A predetermined difference, $\Delta L$, exists between the lengths of the fiber segments 44 and 46 that comprise the interferometer section 40 and this difference effectively "sets" the channel spacings at the output ports 1 and 2. Such difference $\Delta L$ (or rather $\Delta\theta=\Delta(nL)$) is explained in detail in pending U.S. patent application Ser. Nos. 09/861,910 and 09/862,146, now allowed, the teachings of each of which is hereby incorporated by reference.

A narrowband light source 48 provides a monitor signal whose frequency lies outside the nominal frequency band of the DWDM signal transmitted through the network. Such monitor signal is input to the interleaver 28 at a tap coupler 50. As such, the input to the interleaver 28 includes the frequency band of interest as well as a monitor signal outside such band. The latter signal serves as a means for monitoring the effect of environmental factors, such as temperature, upon the operation of the interleaver 28. By examination of the reaction of the out-of-bandwidth monitor signal to transmission through the interleaver 28, one may infer the same effect upon the DWDM channels within the frequency band.

The means provided for monitoring and adjusting the interleaver 28 comprises a feedback loop 52 for continuously examining light of the out-of-band monitor signal at an output of the interleaver 28 (shown as that at the output port 1) and for responsively adjusting the length of at least one of the fiber segments 44, 46 of the interferometer section 40 of the interleaver 28.

The output at the port 1 is sampled by means of a second tap coupler 54. Such a coupler 54 extracts only a small portion of the output signal at the port 1 (about 5 percent or less), leaving the rest of the signal for subsequent network processing. The small amount of optical energy taken from the signal at the output port 1 is then split by means of a 3 dB coupler 55 into two component signals of approximately equal power for use in analyzing the drift of the monitor signal. The first of such component signals is applied to a narrowband filter 56 that is centered at the out-of-bandwidth monitor wavelength.

A photodetector 58 converts the intensity of the optical signal that passes through the narrowband filter 56 into a corresponding electrical signal. A second photodetector 59 is arranged in parallel with the photodetector 58. The photodetector 59, which does not receive the output of the narrowband filter 56 but rather the unfiltered output of the second tap coupler 54 via the 3 dB coupler 55, is provided for assuring that intensity variations observed at the output of the narrowband filter 56 are normalized. This prevents the triggering of a processor 60 to generate a control signal in response to such spurious factors as power fluctuations and losses at the source 48 or within the associated optical network.

The electrical signals output from the photodetectors 58 and 59 are applied to the processor 60. Such processor 60 may comprise any of a number of conventional arrangements for examining the intensity of the monitor wavelength output from the interleaver 28 and responsively generating a signal. Such signal is input to a driver 62 for driving a fiber adjustment element 64 that is arranged to interact with at least one arm 44 of the interferometer section 46 of the interleaver 28. Such interaction is adapted to vary the optical path length of at least one of the fiber arms 44, 46 within the interferometer section 40.

Small adjustments to the optical path length of one or both of the fiber arms 44, 46 alter the locations of the outputs taken at ports 1 and 2 in frequency space. The monitor wavelength injected at the tap coupler 50 is separated from the bandwidth of interest by an integral multiple of the channel spacing as a consequence of passing through the same interferometer section 40 (with fiber arm difference $\Delta L$) as the network DWDM channels. The adjustment to the length of one or more fiber arms 44, 46 essentially leaves the channel spacing at the output ports unchanged due to an order of magnitude difference between $\Delta L$ and the optical path length adjustments ΔL' required to center the frequency of the monitor signal and, hence, the DWDM channels within the frequency band of interest. For example, while Δθ=Δ(nL) may typically be on the order of 1 mm for channel spacing purposes, Δθ'=Δ(nL)' for center frequency alignment is on the order of 0.1λ (λ being the wavelength corresponding to a center frequency) with λ a fraction of 1μ (1μ=0.001 mm).

The processor 60 is programmable and thus suitable for effecting a number of optical path length adjustment routines to control the action of the fiber adjustment element 64. Such routines are geared to adjust the optical path length of one or more of the fiber arms 44, 46 to obtain a maximum optical intensity output at the output of the narrrowband filter 56. The greater the intensity at the output of the narrowband filter 56, the closer the monitor signal is to being aligned to its nominal value in frequency space, from which it may be inferred that the channels within the DWDM frequency band are becoming similarly aligned. Either d.c. or a.c. algorithms may be programmed into and employed by the processor 60 for this purpose. An example of an a.c. process for seeking a maximum is to dither the length of one or more of the fiber arms 44, 46.

Similarly, as shown in FIGS. 4(a) through 4(d), the fiber optical path length adjustment element 64 may comprise one of a number of devices. Each of such devices is capable of causing adjustment of optical path length in response to a signal from the processor 60 by adjusting either the length of the fiber 44, its indes of refraction, or both.

In FIG. 4(a), the optical fiber 44 is wrapped about the circumference of a piezoelectric annulus 66. The circumference of the annulus 66 is responsive to the inputting of a voltage signal from the driver 62 to thereby stretch the length of the fiber 44 and, secondarily, change its index of refraction to thereby change the optical path length of the fiber by a desired ΔL'. Other devices for interacting with one or more fiber arms of the interferometer section 40 to adjust optical path length fiber length are illustrated in FIGS. 4(b) through 4(d). In FIG. 4(b), a stepper motor 68 includes a controllable plunger 70 for selectively bending the fiber 44. In this case, the predominant effect is to alter the index of refraction of the fiber and only secondarily to vary its length. Again, the two factors affect the optical path length in response to a signal from the processor 60. In FIG. 4(c) a pair of pieces of piezoelectric material 72, 74 is arranged at diametrically-opposed positions with respect to the optical fiber to squeeze, and thereby selectively affect the index of refraction (and, hence the optical path length) of the fiber. Finally, as illustrated in FIG. 4(d) a controllable heat emitting element 76 is engaged to one of the fibers 44 or 46 whose output is responsive to a signal from the processor 60. The output of this device selectively affects both the length and the index of refraction of the associated fiber to thereby vary optical path length as desired.

Figure 5A:
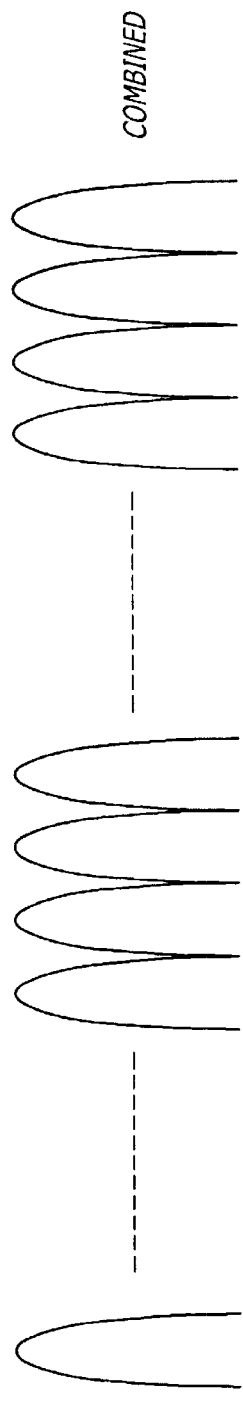
FIGS. 5(a), 5(b) and 5(c) are a series of waveforms for illustrating the operation of the feedback control loop of the invention.
Figure 5B:
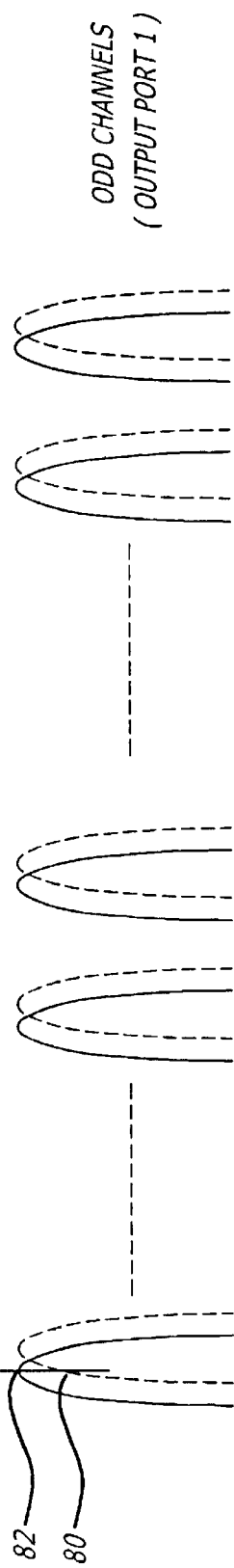
Figure 5C:
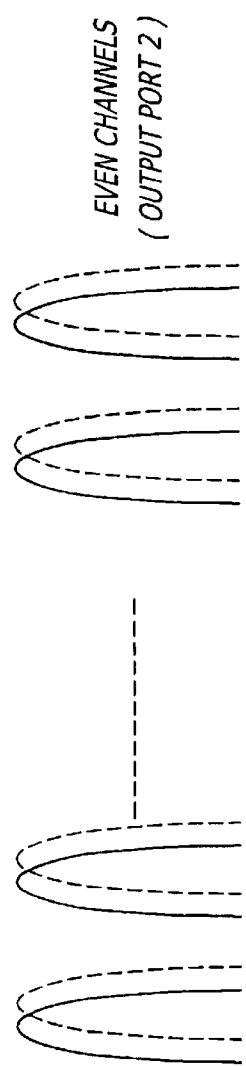

The operation of the interleaver 28 will be further appreciated from the diagrams of FIGS. 5(a) through 5(c). FIG. 5(a) represents the signal input to the interferometer 28. This figure assumes that all network channel frequencies input to the interleaver 28 are properly centered with respect to the transmission grid. In FIGS. 5(b) and 5(c), solid curves represent the correct alignments of the odd and even channels and the monitor frequency at the output ports 1 and 2 while the dashed curves illustrate the shifted positions thereof due to the effects of environmental factors upon the interleaver 28.

As can be seen, the center frequency of the monitor signal experiences the same magnitude and direction of shift off center as does each of the odd and even optical channels. The vertical line 78 represents the center frequency of the narrowband filter 56. As can be seen, when the monitor wavelength (frequency) is shifted off center frequency, the narrowband filter 56 outputs an optical signal of magnitude 80 that is less than the maximum optical intensity 82. The above-described feedback loop 52 continuously examines the output at port 1 and responsively adjusts the length of one or both of the fiber segments 44, 46 as described above to maximize optical intensity at the output of the narrowband filter 56. The process is continuous, concluding only when a stable optical signal intensity is observed at the output of the narrowband filter 56.

As the fiber(s) of the interleaver 28 are stretched within the interferometer section 40, the same shift of the center frequency of the monitor signal is obtained with each of the even and odd channels output at the ports 1 and 2 of the interleaver 28. This occurs as Δθ=Δ(nL) which sets channel spacing (or a multiple of channel spacing) is essentially unaffected by the relatively inconsequential Δθ'=Δ(nL)' adjustment required to center the monitor frequency.

Thus it is seen that the present invention provides apparatus and a method for overcoming off-center frequency drift in an optical fiber interleaver. By utilizing the teachings of this invention, one may address the drift problem in an economical manner and without the costly temperature control measures required by the prior art. The incorporation of this frequency centering feature enables the incorporation of an interleaver in accordance with the invention into an optical network that offers the inherent advantages offered by the interleaver function without any degradation of network function or processes.

While this invention has been illustrated with reference to its presently preferred embodiment, it is not limited thereto. Rather, this invention is limited only insofar as it is defined by the following set of patent claims and includes within its scope all equivalents thereof.

What is claimed is:

1. An optical interleaver for separating an input DWDM signal occupying a nominal frequency band into two output signals, one comprising a plurality of odd optical channels and the other comprising a plurality of even optical channels within said frequency band, said interleaver comprising, in combination:

a) a first optical fiber having opposed ends;

b) a second optical fiber having opposed ends;

c) said first and second fibers being fused together to form first and second couplers to thereby define an input section before said first coupler, an interferometer section between said first and second couplers and an output section after said second coupler;

d) a first tap coupler within said input section for receiving a monitor signal having a nominal frequency;

e) a second tap coupler within said output section for providing an interleaver output signal;

f) an optical path length adjustment element for shifting said monitor signal in frequency space, said optical path length adjustment element being responsive to a feedback signal;

g) a circuit for generating said feedback signal; and h) said circuit being responsive to said output signal.

2. An interleaver as defined in claim 1 wherein said optical path length adjustment element is arranged to affect at least one optical fiber within said interferometer section physically in response to said feedback signal.

3. An interleaver as defined in claim 2 further characterized in that said feedback signal is periodic.

4. An interleaver as defined in claim 2 wherein said optical path length adjustment element includes piezoelectric material.

5. An interleaver as defined in claim 4 wherein said optical path length adjustment element comprises a piezoelectric annulus.

6. An interleaver as defined in claim 4 wherein said optical path length adjustment element comprises s pair of piezoelectric elements arranged to apply a controllable compressive force to said at least one fiber.

7. An interleaver as defined in claim 2 wherein said optical path length adjustment element is arranged to apply heat to said at least one fiber.

8. An interleaver as defined in claim 2 wherein said optical path length adjustment element comprises a stepper motor.

9. An interleaver as defined in claim 1 wherein said circuit includes a first photodetector.

10. An interleaver as defined in claim 9 wherein said circuit additionally includes:
    a) a bandpass filter; and
    b) said filter is arranged to provide an output to said first photodetector.

11. An interleaver as defined in claim 10 wherein said bandpass filter is centered at the nominal frequency of said monitor signal.

12. An interleaver as defined in claim 11 wherein said monitor signal lies outside said frequency band.

13. An interleaver as defined in claim 11 further including a processor for generating said feedback signal in response to an output from said first photodetector.

14. An interleaver as defined in claim 13 further including a second photodetector arranged in parallel with said first photodetector.

15. A method for aligning optical channels at an output of an interleaver to a set of nominal values within a nominal frequency band in frequency space, said interleaver being of the type that includes a first and a second optical fiber, each fiber having opposed ends and fused together between their ends for form first and second couplers to define an input section before the first coupler, an interferometer section between the first and second couplers, and an output section after the second coupler, said method comprising the steps of:
    a) inputting a monitor signal of nominal frequency outside said nominal frequency band at said input section; then
    b) observing said monitor signal at said output section; then
    c) adjusting the optical path length through at least one of said fibers within said interferometer section in response to said observed monitor signal; and then
    d) repeating steps b and c as long as said center frequency of said monitor signal approaches said nominal monitor signal frequency.

16. A method as defined in claim 15 wherein the step of observing said monitor signal additionally comprises the steps of:
    a) applying said monitor signal to a passband filter having a center frequency that corresponds to said nominal monitor signal frequency; and then
    b) detecting the intensity of the output of said passband filter.

17. A method as defined in claim 16 wherein the step of adjusting additionally comprises the step of adjusting the optical path length through at least one of said fibers within said interferometer section.

18. A method as defined in claim 17 wherein the step of adjusting the optical path length through at least one of said fibers within said interferometer section additionally comprises the steps of:
    a) engaging said at least one fiber to a fiber adjustment element so that the optical path length of said fiber is responsive to said fiber adjustment element; and then
    b) applying a feedback signal to energize said fiber adjustment element in response to said signal.

19. A method as defined in claim 18 wherein said signal is a periodic signal.

20. A method as defined in claim 18 wherein said fiber adjustment element includes piezoelectric material.

21. An interleaver as defined in claim 20 wherein said fiber adjustment element comprises a piezoelectric annulus.

22. An interleaver as defined in claim 20 wherein said fiber adjustment element comprises a pair of piezoelectric elements arranged to apply a controllable compressive force to said at least one fiber.

23. An interleaver as defined in claim 18 wherein said fiber adjustment element is arranged to controllably apply heat to said at least one fiber.

24. An interleaver as defined in claim 18 wherein said optical path length adjustment element comprises a stepper motor.

25. A method as defined in claim 17 wherein the step of adjusting the optical path length of at least one of said fibers comprises the additional step of adjusting said optical path length until said intensity of said output of said passband filter is a maximum.

26. A method as defined in claim 17 comprising the additional step of repeating steps b and c of claim 11 until said intensity of said output of said passband filter no longer increases.

* * * * *